(12) United States Patent
Acheson et al.

(10) Patent No.: US 7,770,186 B2
(45) Date of Patent: Aug. 3, 2010

(54) FRAMEWORK FOR DATABASE TRANSACTIONS

(75) Inventors: Alazel Acheson, Redmond, WA (US); Christian Kleinerman, Bellevue, WA (US); Michael Ray Clark, Issaquah, WA (US); Pablo Castro, Redmond, WA (US); Stephen Starck, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1230 days.

(21) Appl. No.: 11/326,947

(22) Filed: Jan. 6, 2006

(65) Prior Publication Data

US 2007/0198455 A1    Aug. 23, 2007

(51) Int. Cl.
*G06F 9/46*     (2006.01)
*G06F 15/16*    (2006.01)

(52) U.S. Cl. ........................... 719/328; 709/201
(58) Field of Classification Search .................. 719/328
See application file for complete search history.

(56) References Cited

U.S. PATENT DOCUMENTS

| | | | |
|---|---|---|---|
| 5,542,078 A | 7/1996 | Martel et al. ................. | 395/600 |
| 6,219,675 B1 | 4/2001 | Pal et al. ..................... | 707/201 |
| 6,542,922 B1* | 4/2003 | Chessell et al. ............. | 709/203 |
| 6,816,873 B2 | 11/2004 | Cotner et al. ............... | 707/201 |
| 6,847,957 B1 | 1/2005 | Morley ........................ | 706/47 |
| 6,950,867 B1 | 9/2005 | Strohwig et al. ............ | 709/224 |
| 2003/0005172 A1* | 1/2003 | Chessell ...................... | 709/316 |
| 2003/0050972 A1* | 3/2003 | Felt et al. .................... | 709/203 |
| 2004/0024610 A1 | 2/2004 | Fradkov et al. .............. | 705/1 |
| 2004/0123293 A1* | 6/2004 | Johnson ....................... | 718/101 |
| 2004/0199509 A1 | 10/2004 | Brodersen et al. ........... | 707/8 |
| 2004/0244004 A1 | 12/2004 | Pardon et al. ................ | 718/100 |

FOREIGN PATENT DOCUMENTS

WO    WO 97/31473    8/1997

OTHER PUBLICATIONS

CARNOT Global Processes, "J2EE-compliant business process management for Oracle9iAS integration," http://www.carnot.ag/downloads/white-papers/oracle-9ias-integration.pdf, 10 pages.

Hp NonStop Kernel Operating System, "Features at a glance," *hp Invent*, http://h20223.www2.hp.com/NonStopComputing/downloads/KernelOpSystem_datasheet.pdf, 11 pages.

Intalio/n³ Server, http://www.intalio.com/products/server/index.xpg, *Italio, Inc.*, http://www.intalio.com/products/server/index.xpg, 3 pages.

(Continued)

*Primary Examiner*—Hyung S Sough
*Assistant Examiner*—Abdou K Seye
(74) *Attorney, Agent, or Firm*—Woodcock Washburn LLP (57) ABSTRACT

Various mechanisms are presented that allow for the coordination of transactions in a managed runtime environment. In one aspect, a runtime environment that is hosted in a database system, includes an application programming interface (API). The API can surface the database transactions as ambient transactions, and present them to some user code. When the user code connects to some remote resource, the ambient transaction can be implicitly propagated to the remoter resource, resulting in coordination of the database transaction with any given transaction running in the remote resource.

11 Claims, 7 Drawing Sheets

OTHER PUBLICATIONS

TimesTen/Transact: Real-Time Transaction Processing System, "Recognising innovation, application and excellence in technology and business," Silicon.com, http://whitepapers.silicon.com/0,39024759,60133147p-39000552q,00.htm, 4 pages.

* cited by examiner

Fig. 7

FRAMEWORK FOR DATABASE TRANSACTIONS

FIELD OF THE INVENTION

The present invention relates to the field of computing, and more particularly, to database transactions.

BACKGROUND

Certain database systems today may provide a complex data management environment. For example, MICROSOFT SQL SERVER is a comprehensive database management platform that provides extensive management and development tools, a powerful extraction, transformation, and loading (ETL) tool, business intelligence and analysis services, and other capabilities. Among other improvements, the MICROSOFT WINDOWS .NET Framework Common Language Runtime (CLR), a runtime environment, recently has been integrated into the SQL SERVER database.

The CLR is an important part of the MICROSOFT .NET Framework, and provides the execution environment for all .NET code. Thus, code that runs within the CLR is referred to as "managed code". The CLR provides various functions and services required for program execution, including just-in-time (JIT) compilation, allocating and managing memory, enforcing type safety, exception handling, thread management, and security. The CLR is now loaded by SQL SERVER upon the first invocation of a .NET routine.

In previous versions of SQL SERVER, database programmers were limited to using Transact-SQL when writing code on the server side. Transact-SQL is an extension of the SQL language as defined by the International Standards Organization (ISO) and the American National Standards Institute (ANSI). Using Transact-SQL, database developers can create, modify and delete databases and tables, as well as insert, retrieve, modify and delete data stored in a database. Transact-SQL is specifically designed for direct structural data access and manipulation. While Transact-SQL excels at set-based operations over data, it is not a full-fledged programming language as are VISUAL BASIC .NET and C#. For example, Transact-SQL does not support arrays, collections, for each loops, bit shifting or classes.

With the CLR integrated into the SQL SERVER database, database developers can now perform tasks that were impossible or difficult to achieve with Transact-SQL alone. Both VISUAL BASIC .NET and C# are modem programming languages offering full support for arrays, structured exception handling, and collections. Developers can leverage CLR integration to write code that has more complex logic and is more suited for computation tasks using languages such as VISUAL BASIC .NET and C#. These programming languages offer object-oriented capabilities such as encapsulation, inheritance and polymorphism. Related code can be easily organized into classes and namespaces.

Managed code is better suited than Transact-SQL for number crunching and complicated execution logic, and features extensive support for many complex tasks, including string handling and regular expressions. With the functionality found in the .NET Framework Base Class Library (BCL), database developers have access to thousands of pre-built classes and routines which can be easily accessed from any stored procedure, trigger or user defined function.

With the CLR runtime environment integrated in the SQL SERVER database, transactions can be performed locally, thus cutting down on operation costs. For example, instead of having a client server sending requests to a database and then obtaining results, data manipulations can be done locally in the database itself. This set-up may be used in the context of transactions that may be distributed over networks of databases and client servers. In such a scenario, it would be advantageous to provide for mechanisms that allow for the coordination of the transactions both within database systems and across system across networks.

SUMMARY

Mechanisms are provided that allow for the transparent coordination of transactions in a managed runtime environment hosted in a database system. For example, a database system can host a runtime environment, where the runtime environment can allow for the execution of user code inside a database engine. The runtime environment may also include an application programming interface (API) to support transactions. Transaction support may entail the exposing or providing of an ambient transaction concept that allows the database system, in a transparent and automatic manner, to present any active database transaction as an ambient transaction to the user code. When the user code connects to an external resource, the database system can transparently propagate the ambient transaction to the external resource. As a result of this propagation, the database transaction and the external resource transaction can be coordinated as one single transaction. This notion, of course, can be applied to a plurality of computing systems over any given computing network.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

Figure 1:
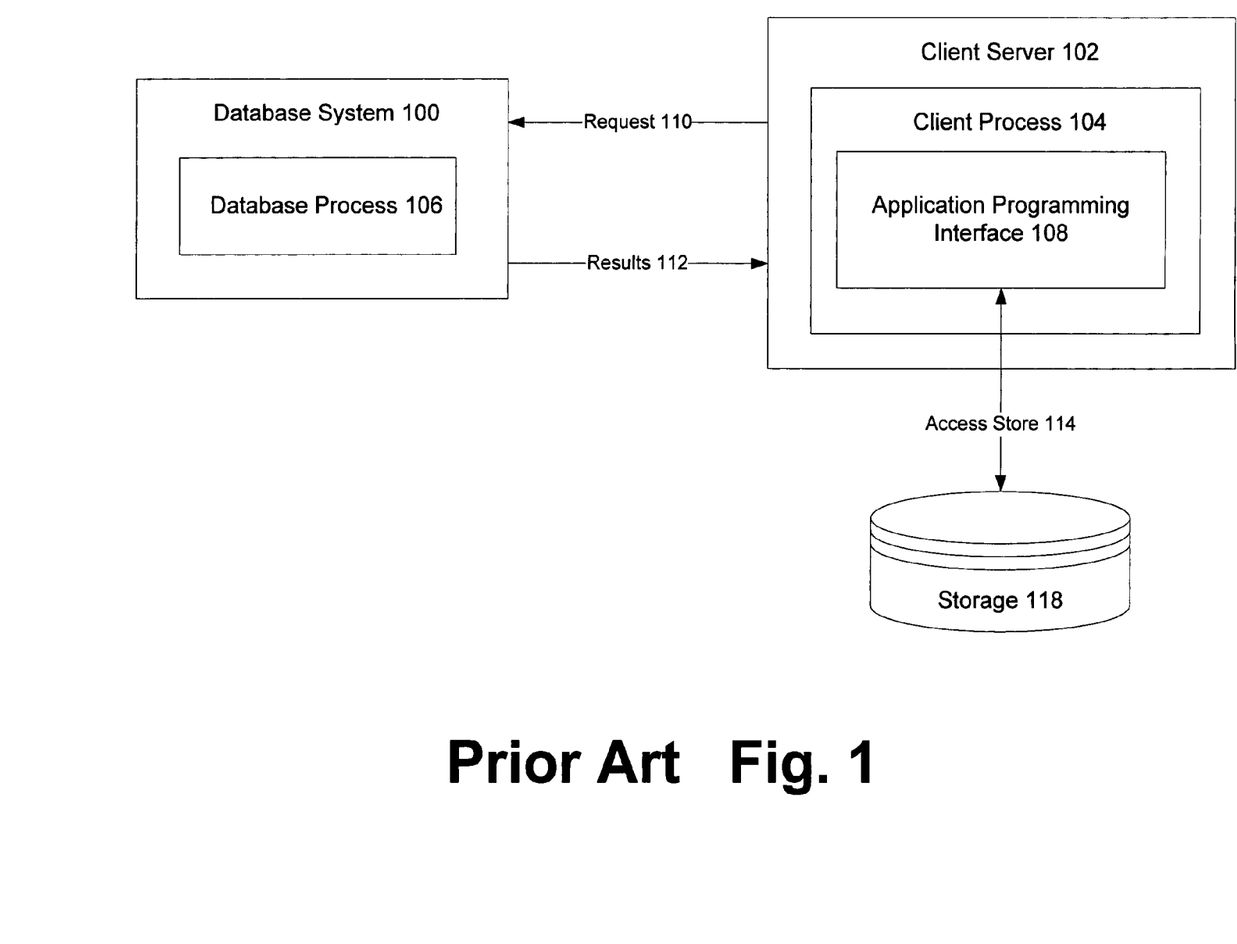
FIG. 1 illustrates a prior art architecture for manipulating data between a database and a client server.
Figure 2:
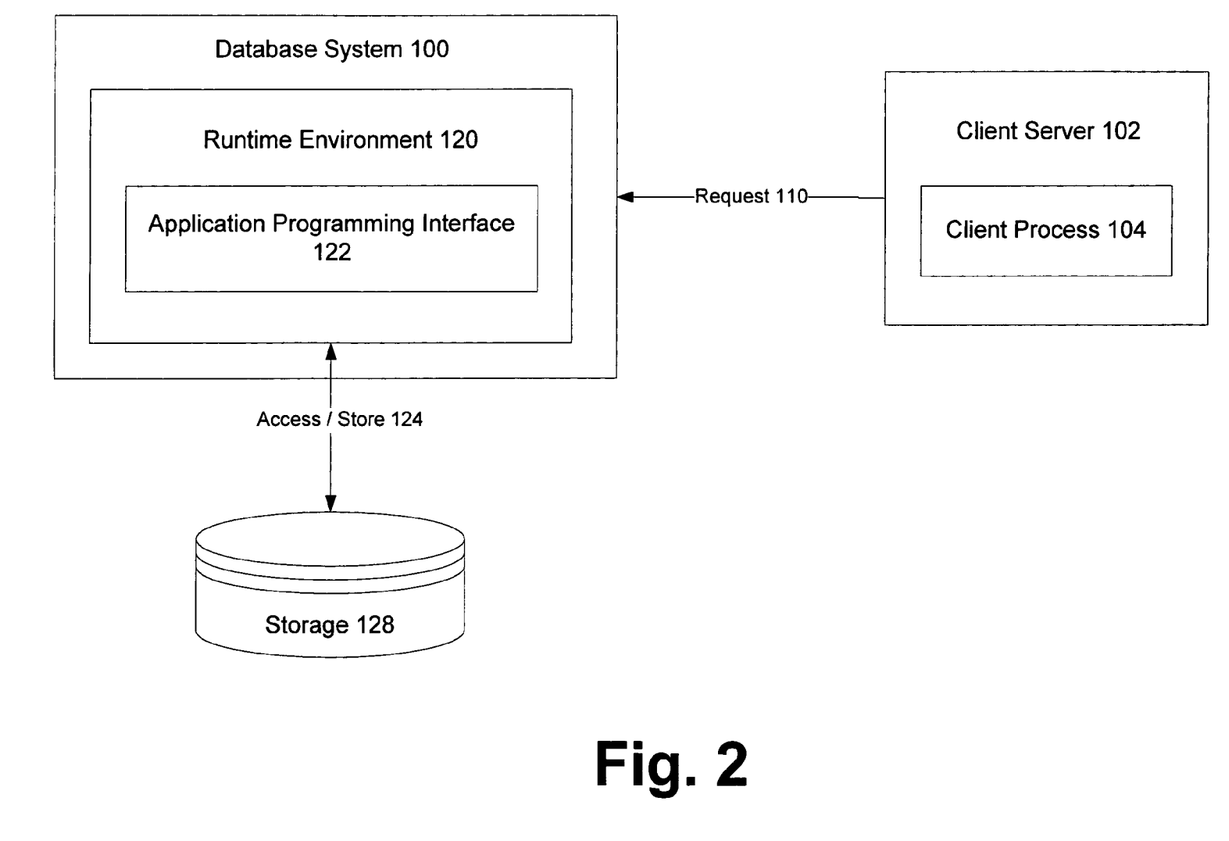
FIG. 2 illustrates a distinct architecture where data manipulation is performed locally in a database due to the establishment of a runtime environment and the pushing out of an application programming interface (API) from a client server to a database system.

This Detailed Description is divided into four main parts. In part I, a context is provided for the presently disclosed subject matter, distinguishing the prior art architecture from the disclosed architecture in the remaining portion of the Detailed Description. FIGS. 1 and 2 illustrate this distinction. In part II, various aspects are discussed of a framework for database transactions, with reference to FIGS. 3-6. In part III, an exemplary implementation of the framework is provided and explained in block diagram form with reference to FIG. 7. Finally, in part IV, additional and ancillary aspects are discussed that could be used by the framework.

I. Context For A Framework For Database Transactions

FIGS. 1 and 2 provide a context for the framework for database transactions. Specifically, FIG. 1 illustrates a prior art architecture for manipulating data between a database and a client server, whereas FIG. 2 illustrates a distinct architecture where data manipulation is performed locally in a database due to the establishment of a runtime environment and the pushing out of an application programming interface (API) from a client server to a database system.

FIG. 1 shows a client server 102 that has some client process 104 running within the server 102. The process 104 may have an API 108 that can access 114 some data storage 118. Thus, if the client server 102 wants to perform some data manipulation with the aid of the database system 100, it may send a request 110 to the database system 100 and some database process 106 can perform a set of tasks specified in the request 110. Upon performing the request 110, the database system 100 can send the results 112 back to the client server 102. Such tasks may involve, the transforming of rows or columns, or the retrieval of information specified by the client server 102.

One problem with this set-up, as hinted at above, is that there are numerous operation costs associated with the sending of data (request 110 and results 112) across a computing network. In a loose sense these are operation costs, but more appropriately, operations costs, incurred with ferrying data and commands between a database system 100 and a client server system 102.

To remedy these operation costs, in FIG. 2, a new architecture or framework for transactions is proposed. In contrast to FIG. 1, FIG. 2 shows that an API 122 is now pushed out to the database system 100 itself, so that a runtime environment 120 may manipulate 124 stored 128 data (it should be noted, however, that there is still an API in the client that's used to start-off a request, which is distinct from the API 122 used for data manipulation). In this set-up, a client server 102 running some client process 104, may request 110 some set of tasks to be performed, and the results of those requests 110 may be performed and stored locally in some persistent storage device 128. The advantage of performing data manipulation locally is apparent in the obviation of the mentioned operations costs. However, such a shift in data manipulation architecture requires that a framework be provided such that transactions performed locally be integrated with corresponding client server 102 transactions—if the two transactions are related in subject matter.

II. Aspects of a Framework Database Transactions

Figure 3:
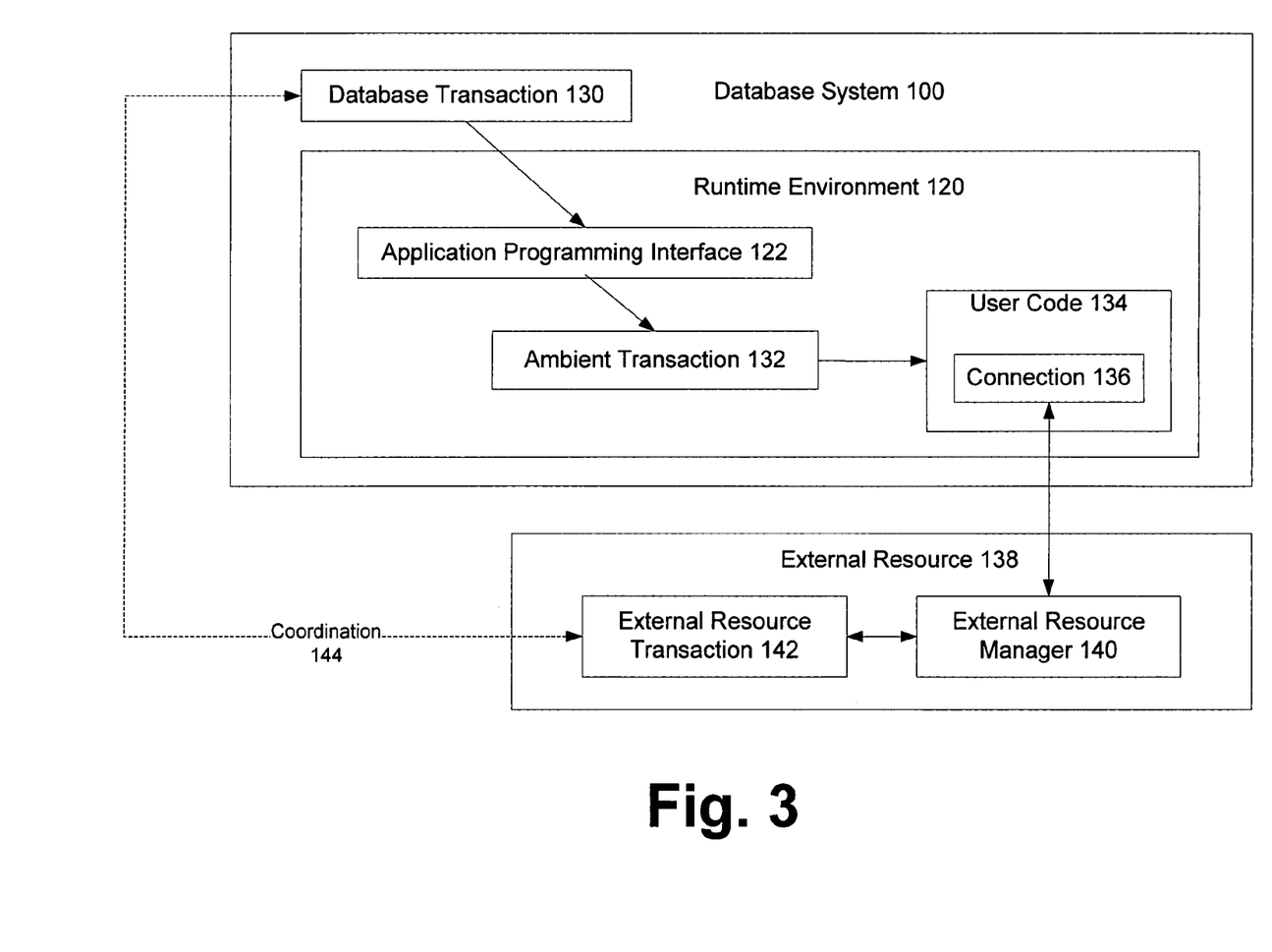
FIG. 3 presents an architectural overview of a database system that employs a framework for database transactions, where the database system hosts a runtime environment.

FIG. 3 presents an architectural overview of a database system that employs a framework for database transactions, where the database system hosts a runtime environment. In FIG. 3, a database system 100 is illustrated that hosts a runtime environment 120. As mentioned above already, such a runtime environment 120 may be the Common Language Runtime (CLR). However, the CLR is merely one such runtime environment 120, and others may be used, as will be readily appreciated by those of skill in the art.

The runtime environment 120 may include an application programming interface (API) 122. The API 122 may project or present an ambient transaction 132 in the runtime environment 120. Such an ambient transaction 132, in one aspect of the presently disclosed subject matter, may be an identifier. This identifier may refer to a database transaction 130 present in the database system 100. In another aspect, the ambient transaction 132 is an identifier that can be distinguishable from an identifier such as a "pointer." Whereas a pointer may refer to a specific memory location, the identifier of the ambient transaction 132 may refer to the database transaction 130 in a manner that establishes a correspondence between the database transaction 130 and the ambient transaction 132. In other words, the ambient transaction 132 can be an instance that corresponds to an active database transaction 130. Put yet another way, the ambient transaction 132 may be an API representation of the database transaction 130.

As such an identifier, the ambient transaction 132 may be accessible by any remote computing system (or the data system 100 itself), in order to identify an active database transaction 130. Once, the ambient transaction 132 is provided or exposed by the API 122, it may then be presented to some user code 134 located in or associated with the runtime environment 120. Such user code 134 can be any procedural code that describes what actions are to be taken with respect so some associated data. Such procedural code 134 can establish connections 136 with external resources 138, such as client servers, other databases, or just about any computing system that handles transactions. Alternatively, however, the user code 134 could be any managed code that is not specifically part of a host—in FIG. 3, the database system 100 being the host. Thus, broadly speaking, to a database server host, such as database system 100, user code is the code that contains rules that the database server manages and executes. Put differently, in the context of this disclosure, user-code may be thought of as a piece executable code that's not intrinsic part of the system 100, but that was created by the user and deployed into the database system 100 for execution inside the database server process. User-code is typically initially created using a programming language and then compiled into executable form using a compiler that's compatible with the target environment.

The concept of a "transaction," as used in the present disclosure, can be defined as a unit of work. Such a transaction can subscribe to at least four basic criteria: (1) atomicity, (2) consistency, (3) isolation, and (4) durability. The atomicity criterion requires that a transaction be either performed completely or not at all. Related to this notion, is the criterion of consistency, where transaction are limited to jumping only between consistent states of a database system Moreover, transactions can also be isolated from other transactions, so that logically no two transactions overlap as units of work and are done separately—this notion, then, is also related to atomicity, in that transactions are atomic. Lastly, transactions may be durable in that if any kind of failure occurs, whether logical or physical, transactions are guaranteed to stay in-tact. A transaction, thus, is a unit of work that subscribes to these four criteria.

From another conceptual point of view, a transaction may be a list of tasks to perform. A transaction may have task A, task B, and task C to perform. For example, one transaction may comprise of taking money out of a savings account, putting that money into a checking account, and providing for a new balance in each account. When this transaction is performed, it may be atomic in the sense that it is performed completely or not at all—in other words, money is not just taken out of the savings account and not put into the checking account. It may be consistent in that the sum total of money is not different or inconsistent before the transaction and after the transaction, such as money disappearing from the savings account and not appearing in the checking account. It may be isolated from other related banking transactions, such as withdrawing money from the checking account via an automatic teller machine. And, it may be durable in the sense that the transfer of funds is recorded and not lost due to some system failure.

There may be a plurality of such transactions existing in the database system 100—or any computing system, for that matter. Transactions, such as the database transaction 130, may have a corresponding ambient transaction 132 that tracks the database transaction 130. Thus, when some code, such as the user code 134, establishes a connection 136 with some external resource manager 140 of some external resource 138, the ambient transaction 132 may be propagated to the external resource 138. Such propagation or passing along of an ambient transaction 132, in the end allows some external resource transaction 142 to coordinate with the database transaction 130.

Such coordination may entail keeping transactions, otherwise distributed along some computing network, consistent with one another. Thus, upon connection 136 by the user code 134, the ambient transaction 132 may be automatically or implicitly passed along with the connection 136. Since, the ambient transaction 132 may identify the database transaction 130, such identification allows the external resource transaction 142 to consult with the database transaction 130 to ensure both transactions are consistent.

Consistency can mean that the units of work to be performed by the two transactions 130 and 142 are in agreement. Thus, for example, if the database transaction 130 has some unit X of work to do, by using an ambient transaction 132 to identify itself to the external resource transaction 142, it can make sure that this latter transaction 142 works in its problem space—that is, performs work that coincides with the former transaction 130. This is especially important when transactions may be distributed over a vast computing network, where the transactions reside on different physical machines—although, in practice both the database system 100 and the external resource 138 could be on the same physical machine, as those of skill in the art will readily appreciate.

Thus, in one aspect of the presently disclosed subject matter, both transactions 130 and 142 can run within the same transaction space—thanks to the ambient transaction 132—which means that both transactions are subject to some set of guarantees, such as those discussed above—atomicity, consistency, isolation, and durability.

In this last mentioned aspect, the external resource transaction 142 can keep track of the database transaction 130, and the database transaction 130 can perform all or a substantial amount of work on behalf of the external resource transaction 142. This may be especially useful in a scenario where whatever data manipulation that is to be done, is better performed (more efficiently performed) in the database system 100 than in the external resource 138—as discussed in the previous section above, where due to operation costs, it was more efficient to perform data manipulation in the database than in the client server.

Figure 4:
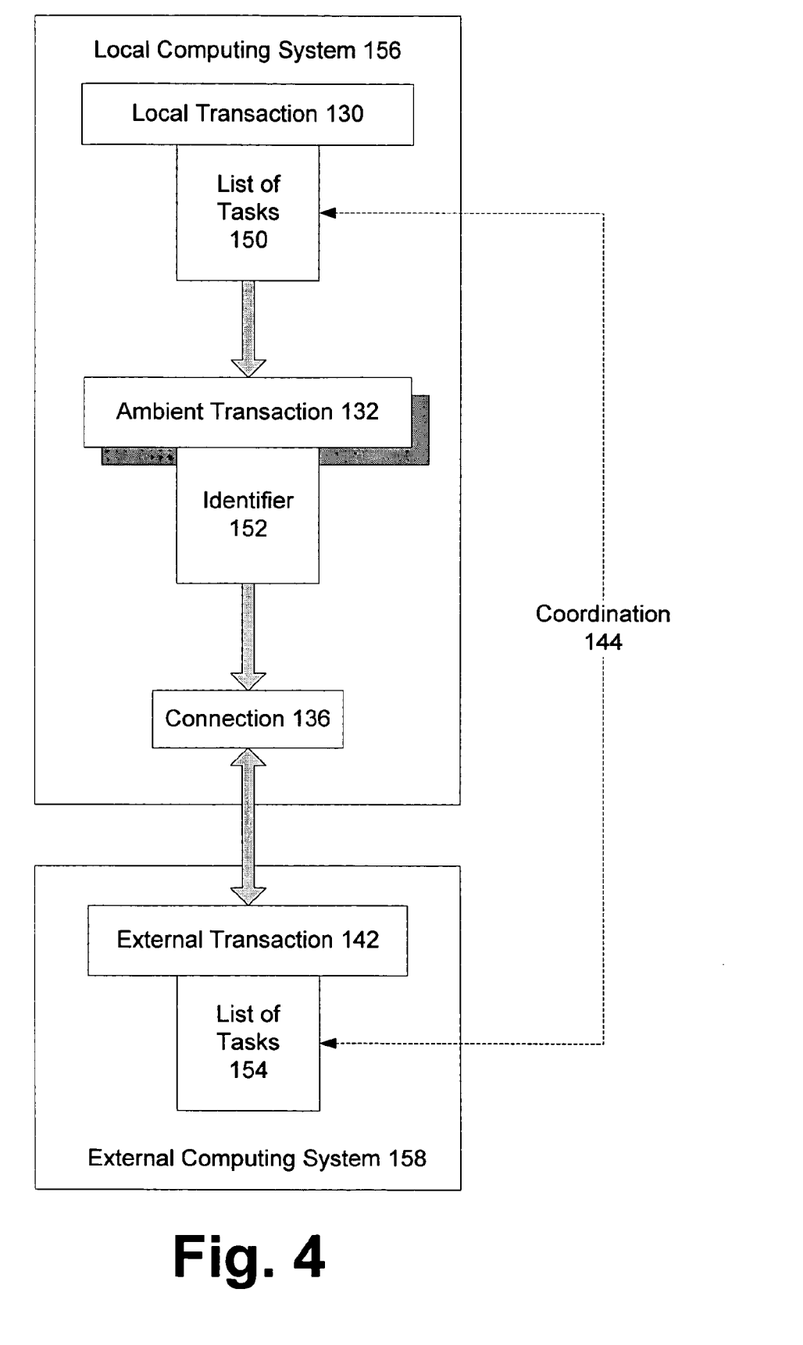
FIG. 4 illustrates one exemplary embodiment of the framework for database transactions, where database transactions work together with lists and identifiers to integrate transactions.

Next, FIG. 4 illustrates one exemplary embodiment of the framework for transaction integration, where database transactions work together with lists and identifiers to integrate transactions. FIG. 4 illustrates some local transaction 130 that may have a list of tasks 150 to perform. This local transaction 130 may be identified via an identifier 152. This identifier 152 may be part of the ambient transaction 132. Upon connection 136 of a local computing system 156 to some external computing system 158, the identifier 152 may be passed to the external computing system 158, allowing the database transaction 130 and the external transaction 142 persisting in the external computing system 158 to be coordinated 144.

As mentioned already, coordination my involve a shared transaction space for the two transaction 130 and 142, where the local transaction 130 may perform a substantial part of data manipulation locally in the local computing system 156. However, because the two transactions 130 and 142 are linked via the ambient transaction 132 identifier 152, they may appear as a single albeit distributed transaction. The identifier 152 that links these two transactions 130 and 142 may persist in some agreed upon space such that other computing system connecting up to the local computing system 156 may also integrate their transactions with any local transaction(s). Transaction coordinators (not pictured) can coordinate the relationships between such distributed transactions. Such relationships may specify what tasks each computing system will perform for its transaction despite the fact that logically such distributed transactions may be treated as single transactions. Of course, such distributed transactions don't have to be treated as logically single transactions, but could easily be treated as some set of transaction, as those skilled in the art would appreciate.

Figure 5:
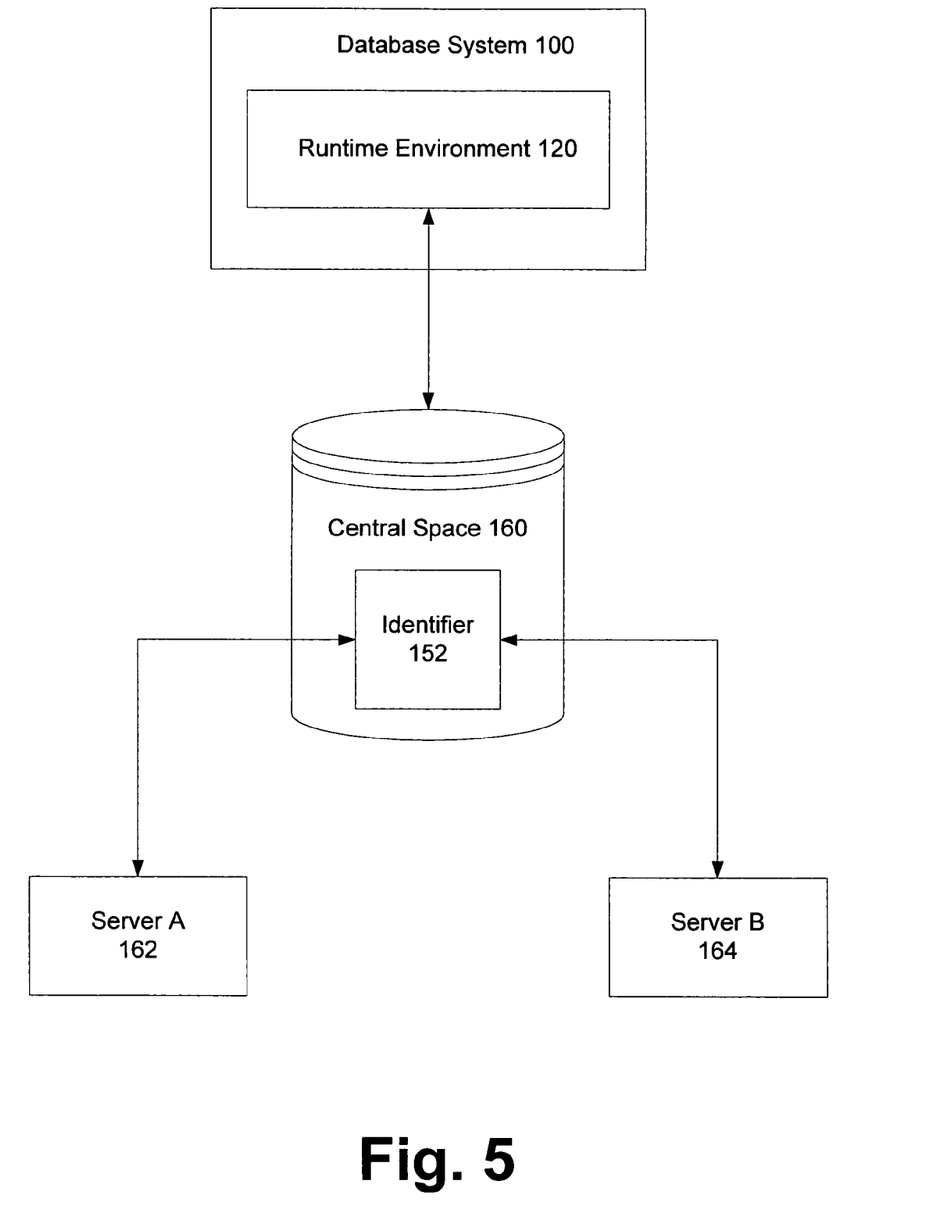
FIG. 5 explicitly shows that the identifier of an API generated ambient transaction may be accessible in some central space.

FIG. 5 explicitly shows, as has already been discussed, that the identifier 152 of an API generated ambient transaction may be accessible in some central space 160. Such central accessibility allows for a plurality of computing systems to integrate their transaction with the database system 100 transactions. It should be noted that identifiers 152 may be managed by the runtime environment 120 and they may be stored in a plurality of centrally accessible locations. Likewise, it should be noted that each computing system may have its own set of ambient transactions that identify their underlying computing transactions. Thus, the APIs mentioned above may persist not only in database systems, but in any systems partaking in the runtime environment 120.

Figure 6:
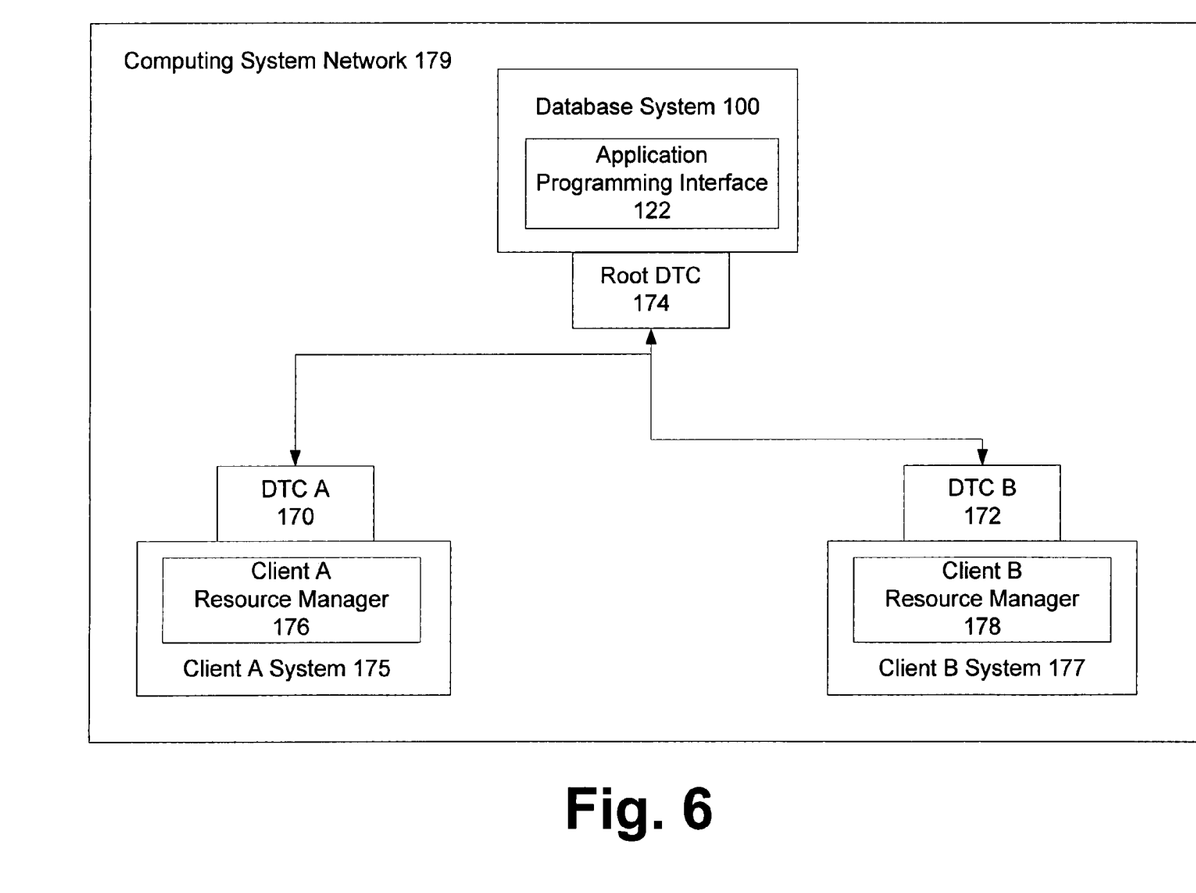
FIG. 6 explicitly shows that transaction integration may be coordinated by some transaction coordinators.

FIG. 6 likewise makes explicit notions mentioned above, where coordination between transaction integration may be managed by transaction coordinators. Thus, a root database transaction coordinator (DTC) (or equivalently, a "transaction coordinator") 174 may manage relationships between transactions on different computing systems 175 and 177. Each computing system may have such a coordinator 170 and 172 that is subordinate to some uber-coordinator such as the root coordinator 174. The respective resource managers 176 and 178 of the computing systems 175 and 177 may handle transactions distributed over a computing network 179. Of course, such coordination does not have to occur on a distributed network, but may easily occur on a single physical machine, such as a single physical machine running several virtual machines.

III. Exemplary Implementation of the Framework For Database Transactions

Figure 7:
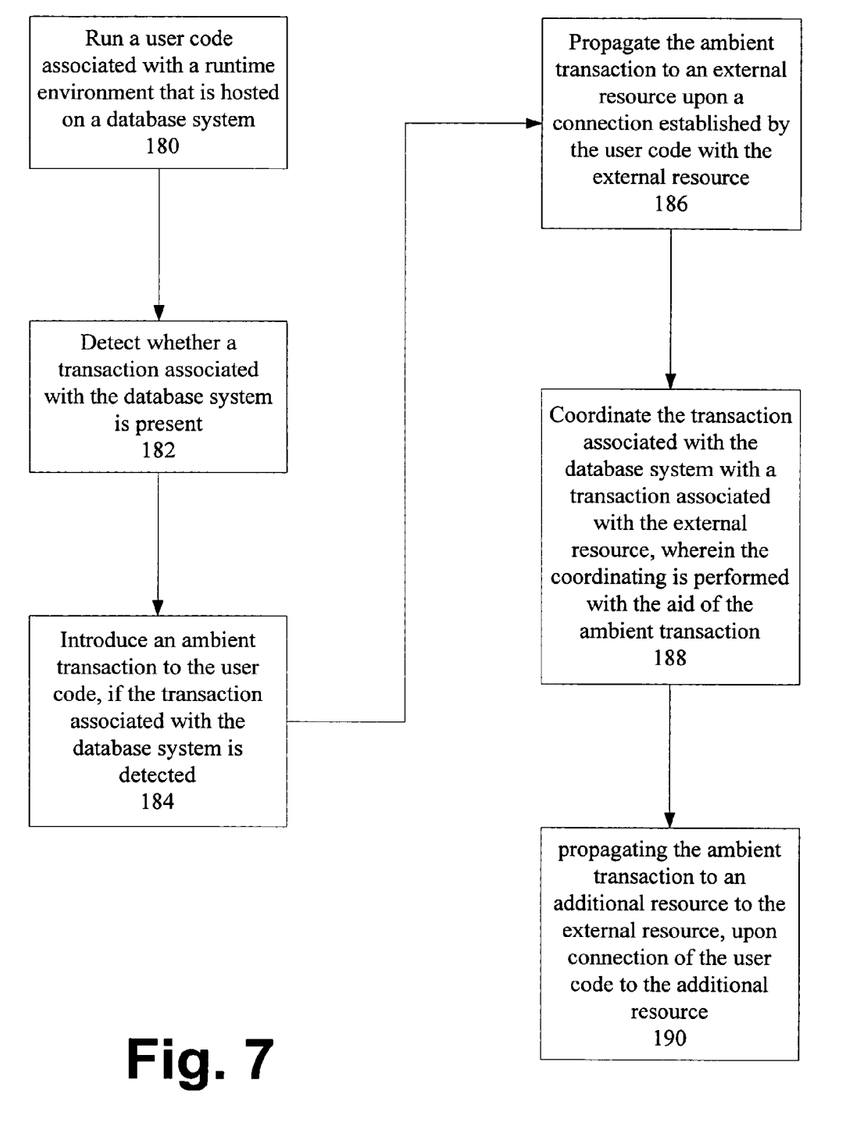
FIG. 7 illustrates in block diagram form an exemplary implementation of the framework for database transactions.

FIG. 7 illustrates a block diagram flowchart of an exemplary implementation of the framework for database transactions. At block 180 a user code is run, where the user code may establish a connection with a computing system, such as a client server. The user code is associated with a runtime environment that is hosted on a database system (or any computing system). Once the user code established the connection, any relevant information regarding an active transaction running on the database system may be passed along to the computing system.

At block 182, the database system may detect whether a transaction associated with the database system is present—or furthermore, whether it is active in the database system. If such a transaction is active, i.e., there is a list of tasks to be performed in the database system, such a transaction can be projected to be, via an API, an ambient transaction.

Thus, at block 184, an ambient transaction is introduced to the user code that has connected to the computing system. Moreover, if the transaction associated with the database system is detected, at block 182, it may then be passed along as an ambient transaction. In other words, an identifier (or some other representation) of the database system transaction can be presented to the computing system.

At block 186, the ambient transaction is in fact propagated to the computing system, which may be an external resource, such as a client server. Such propagation may be automatic and implicit, so the a user of the database system does not have to worry about such propagation, nor does not have to do anything to propagate the ambient transaction. This allows, as discussed already, for the integration of transaction even if such transaction are distributed all over some given network.

At block 188, a coordination may take place between the transaction associated with the database system and the transaction associated with the external resource. The coordination is aided by the ambient transaction since it identifies the former transaction to the latter.

Finally, at block 190, because the database system can interact with a plurality of other computing systems, the ambient transaction can be propagated to other additional resources other than the external resource. In short, any computing system that connects to the database system can have the ambient transaction propagated to it. Such propagation may span to any computing system that shares in a distributed (or local) transactional relationship with the database transaction.

Of course, as will be appreciated by those skilled in the art, these are merely exemplary steps in a vastly complicated and diverse transactional system. Other steps, as discussed in this Detailed Description could easily be imagined by those skilled in the art.

Also, it should be noted that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

IV. Additional Aspects of the Framework For Database Transactions

As indicated above already, database transactions can be treated as runtime environment transactions. In one aspect of the presently disclosed subject matter, the .NET Framework—which encompasses the CLR as well as a class library built of top of it—defines an API for transaction management called "System.Transactions", which can be identified with the API 122 mentioned in FIG. 3. When used in client and middle-tier applications, this API can initiate transactions, join existing transactions, and handle all the details of dealing with transaction managers (TMs) and resource managers (RMs).

System.Transactions can define the concept of a "current" transaction. When there is an active current transaction in a given context, all RMs involved in that context can automatically detect the active transaction and enlist their resources into it. This provides a very intuitive model where a "transaction scope" can be defined, and everything that happens inside such scope is transacted if the involved RMs support transactions.

This concept can be extended to the database. The main difference is that in this scenario the existence of an active transaction can not only be due to an explicit creation of a transaction by the user (calling the System.Transactions API), but also due to an existing database transaction at the point where the user-code was invoked. Thus, for example, if a user begins a database transaction and then invokes a database stored-procedure, the system will automatically present the database transaction as a System.Transactions active current transaction.

This model nicely integrates with the database transactions model, as the user code will see an active transaction regardless of how it was created. This is particularly useful for scenarios that might not be obvious at first, such as single-statement implicit transactions (e.g. scalar function invocation in DML statements).

Another interesting aspect of the presently disclosed subject matter involves automatic transaction enlistment. The data-access API for the .NET Framework (ADO.NET) is designed to be integrated with System.Transactions to minimize the amount of work that consumers need to do in order to use these two APIs together. In particular, whenever an ADO.NET connection is opened in a context that has an active transaction, ADO.NET will automatically enlist the connection in that transaction.

Although this is not SQLCLR-specific, this greatly contributes to the end-to-end solution, because connections created inside SQLCLR when there is an active transaction will be automatically enlisted—regardless of whether the active transaction came from the database or was created by the user in managed code.

In still another aspect—although one that was discussed in some detail above already—in a database system, "local" transactions are transactions that are scoped to a particular instance of the database, and may also be scoped to a particular connection. A distributed transaction, on the other hand, can span several resource managers (which may or may not be databases) and multiple connections. In the database environment, differences between local and distributed transactions may surface to the language (for example, BEGIN TRANSACTION versus BEGIN DISTRIBUTED TRANSACTIONS). In the System.Transactions API there may be no distinction (from the API consumer perspective) between local and distributed transactions. By using the System.Transactions model in the database, developers using the CLR don't need to deal with local and distributed transactions differently. All are surfaced as System.Transactions objects.

In an additional aspect, transactions can be delegated and promoted. Due to it's very nature, distributed transactions are typically expensive from the resource utilization perspective (particularly network bandwidth and CPU utilization). The System.Transactions API introduces a particular specialization of transactions that enable certain optimizations that can lower resource usage in certain systems. Initially, when no RM is involved, a System.Transactions transaction is only an in-memory construct. When the first RM is involved, two things can happen: (1) for "regular" RMs, the transaction will become a distributed transaction and the RM will be enlisted; (2) for RMs that support "delegation/promotion", the RM will be asked to start a "local" transaction (local to that RM). That means that no distributed transaction is started; instead, a local-only transaction within an RM has been started. Put another way, the transaction has been "delegated" to the RM.

Later on, a second RM may be involved with the same transaction. In order to enlist the second RM a real distributed transaction is needed. For that, System.Transactions will ask the first RM to "promote" the previously created transaction from "local" to "distributed". Once it's a distributed transaction, resource enlistment from the second RM can proceed as normal. The optimization is that in the cases where a second RM is not involved, the overhead of a distributed transaction is saved.

Put another way, the integration among System.Transactions and SQLCLR makes database transactions automatically surface as System.Transactions transactions. In the scenario described above, it may not be an option to force all transactions to be distributed, because of the performance and resource-usage implications. System.Transactions already has a mechanism where it can "delegate" the transaction to a RM if the RM can handle delegation. In order to be able to handle delegation, RMs need to support "promotion", where a local transaction is promoted to a distributed one; this is used by System.Transactions when a second RM is brought to the picture; in that case the transaction is promoted through the first RM, and then the second RM is enlisted in the resulting distributed transaction.

SQLCLR transactions leverage and extend this mechanism. Not only can System.Transactions delegate a transaction to SQL Server, which is acting as a RM, but it also can attach to an existing transaction instead of always being the root (the root was mentioned with reference to FIG. 6). The attachment mechanism defines a "superior" and a "subordinate" component that are chained together, allowing System.Transactions to attach to an outer transaction that's not a System.Transactions transaction.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, a framework for transaction integration was provided. However, other equivalent mechanisms to these described aspects are also contemplated by the teachings herein. Therefore, the present disclosure should not be limited to any single aspect, but rather construed in breadth and scope in accordance with the appended claims.

The invention claimed is:

1. A system providing a framework for transaction integration, the system comprising:
an external computing system which allows a connection to a local computing system database server processor; and
the local computing system database server processor configured to perform the steps of:
running a user code associated with a runtime environment that is hosted on a database system, wherein the user code is executable code that is not an intrinsic part of the database system, and wherein the user code was created and deployed into the database system for execution;
detecting a transaction within the database system;
responsive to the detecting of the database system transaction, introducing an ambient transaction to the user code, wherein the ambient transaction is presented via an application programming interface, wherein the application programming interface implements a distributed transaction without the user code delineating between the distributed and a local transaction;
propagating the ambient transaction automatically to the external computing system upon a connection established by the user code with the external computing system, wherein the propagating of the ambient transaction to the external computing system comprises passing an identifier of the transaction associated with the database system to a resource manager of the external computing system, wherein the ambient transaction contains a list of tasks to perform, and wherein the propagating of the ambient transaction to the external computing system upon the connection established by the user code with the external computing system is performed without user interaction; and
wherein the local computing system database server processor programmed to perform the steps further comprising coordinating of the transaction associated with the database system and the transaction associated with the external computing system resulting in a single coordinated transaction; wherein the coordinating of the transaction is managed by transaction coordinators, wherein there is a root database transaction coordinator which manages relationships between transaction coordinators on different computing systems.

2. The system according to claim 1, wherein the transaction associated with the database system is an active transaction.

3. The system according to claim 1, wherein the runtime environment is Common Language Runtime environment.

4. The system according to claim 1, wherein the database system transaction can be delegated and promoted.

5. The system according to claim 1, wherein the user code is managed code that is not specifically part of the database system.

6. A method for providing transaction integration, comprising:
running a user code associated with a runtime environment that is hosted on a database system, and wherein the user code is executable code that is not an intrinsic part of the database system, and wherein the user code was created and deployed into the database system for execution;
detecting a transaction within the database system;
responsive to the detecting of the database system transaction, introducing an ambient transaction to the user code, wherein the ambient transaction is presented via an application programming interface, wherein the application programming interface implements a distributed transaction without the user code delineating between the distributed and a local transaction; and propagating the ambient transaction automatically to an external resource upon a connection established by the user code with the external resource, wherein the propagating of the ambient transaction to the external resource comprises passing an identifier of the transaction associated with the database system to a resource manager of the external resource, wherein the ambient transaction contains a list of tasks to perform, and wherein the propagating of the ambient transaction to the external resource upon a connection established by the user code with the external resource is performed without user interaction; and coordinating of the transaction associated with the database system and the transaction associated with the external resource resulting in a single coordinated transaction; wherein the coordinating of the transaction is managed by transaction coordinators, wherein there is a root database transaction coordinator which manages relationships between transaction coordinators on different computing systems.

7. The method according to claim 6, wherein the coordinating is performed with the aid of the ambient transaction.

8. The method according to claim 7, wherein the coordinating comprises of integrating a transaction space for the transaction associated with the database system and a transaction space for the transaction associated with the external resource.

9. The method according to claim 7, further comprising propagating the ambient transaction to an additional resource to the external resource, upon connection of the user code to the additional resource.

10. The method according to claim 6, further comprising identifying the ambient transaction with an identifier, wherein the identifier references the transaction associated with the database system.

11. A computer readable storage medium storing computer executable instructions for providing computing system transaction integration, comprising:

an application programming interface, wherein the application programming interface is configured to be included in a runtime environment that is configured to be hosted on the computing system, wherein the application programming interface is configured to detect an active transaction on the computing system and is configured to project implicitly the active transaction as an ambient transaction to a user code, wherein the user code is managed code that is not specifically part of a database process of the computing system, wherein the application programming interface implements a distributed transaction without the user code delineating between the distributed and a local transaction, wherein the application programming interface is configured to propagate the ambient transaction to a remote computing system upon a connection established by the user code with the remote computing system, wherein the propagating of the ambient transaction to the remote computing system comprises passing an identifier of the active transaction associated with the database process to a resource manager of the remote computing system, wherein the ambient transaction contains a list of tasks to perform, and wherein the propagating of the ambient transaction to the remote computing system upon the connection established by the user code with the remote computing system is performed without user interaction, thereby providing for coordination of the active transaction with at least one transaction of the remote computing system resulting in a single coordinated transaction; and wherein the coordinating of the active transaction is managed by transaction coordinators, wherein there is a root database transaction coordinator which manages relationships between transaction coordinators on different computing systems.

* * * * *